United States Patent
Chadha et al.

(10) Patent No.: US 9,838,278 B2
(45) Date of Patent: Dec. 5, 2017

(54) SELF-LEARNING DEVICE CLASSIFIER

(71) Applicants: Naunidh Singh Chadha, San Mateo, CA (US); Deepak Jain, San Mateo, CA (US); Ankush Garg, San Mateo, CA (US)

(72) Inventors: Naunidh Singh Chadha, San Mateo, CA (US); Deepak Jain, San Mateo, CA (US); Ankush Garg, San Mateo, CA (US)

(73) Assignee: GUAVUS, INC., San Mateo, CA (US)

( * ) Notice: Subject to any disclaimer, the term of this patent is extended or adjusted under 35 U.S.C. 154(b) by 173 days.

(21) Appl. No.: 15/054,557

(22) Filed: Feb. 26, 2016

(65) Prior Publication Data

US 2017/0250879 A1 Aug. 31, 2017

(51) Int. Cl.
*H04L 12/28* (2006.01)
*H04L 12/26* (2006.01)
*H04L 29/12* (2006.01)
*G06F 17/30* (2006.01)

(52) U.S. Cl.
CPC ........ *H04L 43/04* (2013.01); *G06F 17/30519* (2013.01); *H04L 61/35* (2013.01)

(58) Field of Classification Search
CPC .... H04L 43/04; H04L 61/35; G06F 17/30519

USPC ........................................................ 370/392
See application file for complete search history.

(56) References Cited

U.S. PATENT DOCUMENTS

| | | | |
|---|---|---|---|
| 8,111,629 B2 | 2/2012 | Oron | |
| 9,135,293 B1 | 9/2015 | Kienzle et al. | |
| 9,225,732 B2 | 12/2015 | Beyah et al. | |
| 2012/0069752 A1 | 3/2012 | Larocque et al. | |
| 2013/0128885 A1* | 5/2013 | Kardashov | H04L 45/38 370/389 |
| 2013/0137475 A1* | 5/2013 | Rousu | H04W 72/0453 455/509 |
| 2013/0242795 A1 | 9/2013 | Heen et al. | |

FOREIGN PATENT DOCUMENTS

WO   2012155026 A1   11/2012

* cited by examiner

*Primary Examiner* — Faisal Choudhury
(74) *Attorney, Agent, or Firm* — Morgan, Lewis & Bockius LLP

(57) ABSTRACT

Systems and methods classify unknown devices communicating over a packet-switched network based on traffic-borne characteristics comprising packet parameters, flow parameters, and/or operating-system parameters. Embodiments utilize "self-learning" to optimize the level of classification accuracy.

16 Claims, 3 Drawing Sheets

US 9,838,278 B2

SELF-LEARNING DEVICE CLASSIFIER

FIELD OF THE APPLICATION

The present application generally relates to the field of telecommunication networks, and more particularly to methods, apparatus and systems for classifying network traffic.

BACKGROUND

Computer-network providers and/or operators face many challenges in delivering network services to customers or partners. Not the least of these involves tailoring the overall system so that the nodes actually routing and switching data among servers, end users and intermediate stations are optimized for the devices originating and receiving the data. Determining how much network traffic is attributable to particular types of devices—e.g., "smart" phones and tablets, mobile routers, limited-feature phones, etc.—allows network operators to dynamically alter traffic policies in order to reduce network congestion. Device type detection can also be used for security purposes (e.g., to enable device-level authorization) and to prevent improper "tethering," i.e., using a device such as a smart phone as a broadband connection for other devices such as laptops, netbooks or other smart phones.

Wireless devices may be identified using a "type allocation code" (TAC). These codes identify specific device types and are maintained in large databases, which are constantly expanding as new devices enter the market with new TACs. As a consequence, even exhaustive TAC databases are often out of date with respect to the newest devices, since database updates are expensive and therefore do not occur as frequently as might be desirable. Moreover, TAC databases are often accessed on an offline basis, which increases the likelihood they will be out of date. And thinly marketed or "gray market" devices may not comply with TAC-allocation procedures, and so never receive TACs.

At least for purposes of network diagnostics, it is often sufficient to establish the general type of device, and for many applications just knowing whether a device is a smart phone may suffice. To classify unknown devices, many existing systems utilize "fingerprinting" techniques that infer a device type based on measurable characteristics of traffic produced by the device. In a packet-switched network, in which small units of data called packets are routed through the network based on a destination address contained within each packet, these systems may capture packets at an intermediate node between the originating device to be identified and the destination, and measure properties of the captured traffic such as packet inter-arrival time. Particular value ranges ("fingerprints") of these properties may be known in advance to be associated with a certain type of device, enabling it to be identified. Where such associations are absent, they may be generated by analysis of traffic known to originate with a particular type of device.

This approach requires active database management analogous to that required to maintain TAC databases: fingerprints are established for particular devices by analyzing them individually, and the resulting parameter values are then introduced into a fingerprint database (which, again, is analogous to a TAC database). What is needed, however, is a way of classifying devices in a fully automated manner and without advance knowledge of device characteristics.

SUMMARY

Embodiments disclosed herein relate to systems and methods for classifying unknown devices based on traffic-borne characteristics—e.g., characteristics such as initial packet size, initial "time to live," window size, maximum segment size, window scaling value, and the status of one or more TCP flags or bits (e.g., "don't fragment," "sackOK," "nop"). By "traffic-borne characteristics" is meant any characteristics relevant, to identification of a device that may be inferred from analysis of packets sent from the device. Such characteristics may be at the flow or transaction level (e.g., how often packets are sent), or at the packet level (e.g., values of parameters or data fields within a packet). Furthermore, for ease of explanation, the term traffic-borne characteristic connotes one or multiple characteristics, since, for example, even a single characteristic may involve one or more underlying parameters, Device identification can be employed for purposes of diagnosing and addressing network conditions or anomalies, for device-level authorization, to allow network operators to make informed equipment-purchase and network-expansion decisions, and for data analytics.

In various embodiments, device classifications are made predictively to conform to a user-specified level of accuracy. This may be achieved by identifying sets of traffic-borne characteristics exhibited by an unknown device and having sufficient predictive capacity to classify the device with the desired accuracy level. These sets of characteristics may be identified, in various embodiments, using a "self learning" technique based on analysis of known devices, the identities of which may evolve over time (e.g., as new signatures are identified or older ones are used less frequently).

Accordingly, in a first aspect, the invention pertains to system for identifying unknown devices communicating over a computer network. In various embodiments, the system comprises a computer network comprising a plurality of intercommunicating forwarding devices for receiving packets from originating devices via one or more ingress ports and forwarding packets via one or more egress ports to destination devices and at least one listening node connected to the network. The listening node may comprise a network interface for receiving packet information from one or more of the forwarding devices; a first database mapping device identifiers to traffic-borne packet characteristics associated therewith; a second database mapping traffic-borne packet characteristics to a plurality of device classifications, where each record of the second database specifies, for at least one traffic-borned packet characteristic, a population fraction of devices within the device classifications that exhibit the at least one traffic-borned packet characteristic; a feature-extraction module for extracting the traffic-borne packet characteristics from the received packet information; a classification module for identifying, from the first database, originating devices from the traffic-borne packet characteristics extracted by the feature-extraction module from packet flows associated with the originating devices, and further identifying unknown originating devices for which no identification can be made from entries in the first database; and an analysis module for classifying the unknown devices identified by the classification module to a user-supplied degree of accuracy within at least one selected device classification. The analysis module may be configured to identify, for the unknown devices, a plurality of traffic-borne packet characteristics each having an associated population fraction in the second database above a predictiveness threshold for the selected device classification; identify a subset of the identified traffic-borne packet characteristics that produces a selected classification accuracy level; and determine, based on the identified subset of traffic-borne packet characteristics, whether the unknown device is within at least one said selected device classification at the selected classification accuracy level, and, if so, classifying the device.

In some embodiments, the analysis module is configured to identify the subset of the identified traffic-borne packet characteristics by determining, based on training data from known devices, predictive accuracies for the identified traffic-borne packet characteristics corresponding to a population fraction of known devices that exhibit the characteristic. The training data may be obtained, for example, from at least one TAC database. Each of the traffic-borne packet characteristics may be one or more signature elements, and the signature elements may be packet parameters, flow parameters, and/or operating-system parameters.

In various embodiments, the analysis module is further configured to adjust the predictiveness threshold to a value above which analysis based solely on traffic-borne packet characteristics exceeding the threshold classification accuracy level do not substantially increase the classification accuracy level. The system may also include an allocation module for allocating network and/or repair resources based on the device classification.

In another aspect, the invention pertains to a method of identifying unknown devices communicating over a computer network comprising a plurality of intercommunicating forwarding devices for receiving packets from originating devices via one or more ingress ports and forwarding packets via one or more egress ports to destination devices. In various embodiments, the method comprises the steps of providing a first database mapping device identifiers to traffic-borne packet characteristics associated therewith; providing a second database mapping traffic-borne packet characteristics to a plurality of device classifications, where each record of the second database specifies, for at least one traffic-borned packet characteristic, a population fraction of devices within the device classifications that exhibit the at least one traffic-borned packet characteristic; receiving packets over the network and extracting traffic-borne packet characteristics therefrom; identifying, using the first database, originating devices from the extracted traffic-borne packet characteristics thereof; identifying unknown originating devices for which no identification can be made from entries in the first database; and classifying the unknown devices to a user-supplied degree of accuracy within at least one selected device classification by identifying, for the unknown devices, a plurality of traffic-borne packet characteristics each having an associated population fraction in the second database above a predictiveness threshold for the selected device classification; identifying a subset of the identified traffic-borne packet characteristics that produces a selected classification accuracy level; and based on the identified subset of traffic-borne packet characteristics, determining whether the unknown device is within at least one said selected device classification at the selected classification accuracy level, and, if so, classifying the device.

In some embodiments, the subset of the identified traffic-borne packet characteristics are identified by determining, based on training data from known devices, predictive accuracies for the identified traffic-borne packet characteristics corresponding to a population fraction of known devices that exhibit the characteristic. The training data may be obtained, for example, from at least one TAC database. Each of the traffic-borne packet characteristics may be one or more signature elements, and the signature elements may be packet parameters, flow parameters, and/or operating-system parameters.

The method may further comprise the step of adjusting the predictiveness threshold to a value above which analysis based solely on traffic-borne packet characteristics exceeding the threshold classification accuracy level do not substantially increase the classification accuracy level. In some embodiments, the method further comprises the step of allocating network and/or repair resources based on the device classification.

Various advantages of the present application are apparent in light of the descriptions below.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Embodiments of the present invention can be deployed on any computer network, though it is most commonly employed in connection with large telecommunication networks. As used herein, the term "computer network" means a system of intercommunicating computational and/or communication devices, and includes both networks of computational devices and the public telecommunications infrastructure. Such computer networks include wired or wireless local-area networks (wired LAN or WLAN), wide-area networks (WANs), the Internet, local intranets, and/or other types of networks. A "network operator" is an entity (or one of a plurality of entities) such as a person, a company, an organization, a server or other computer, etc., responsible for operating, allocating, and managing network resources. The term "substantially" or "approximately" means±10% (e.g., by weight or by volume), and in some embodiments, ±5%.

In general, embodiments of the invention predicate classification of a device on analysis of data packets produced by the device and transmitted over a computer network. Device packet creation typically involves interaction among hardware and software components of a network-connected device or "node." The instruction set that initiates packet creation is executed by a central processing unit (CPU) in concert with the device operating system (OS). The device's network interface moves the packet data from main memory into a transmit buffer and send the packet out onto the network through a medium access control (MAC) unit. Given the number of different vendors for a given type of device, and the number of different components and algorithms that can be selected to perform packet-related functions, opportunities for diversity are substantial; the packet-creation process can vary considerably across architectures. At the component level, the inherent variability of wire delays, parasitic gate delays, device clock skew, and fundamental differences in device fabrication may make various attributes of packet creation and transmission (i.e., traffic-borne characteristics) unique. The architecture variations may enable device type identification while the component level variations may enable device identification.

Figure 1:
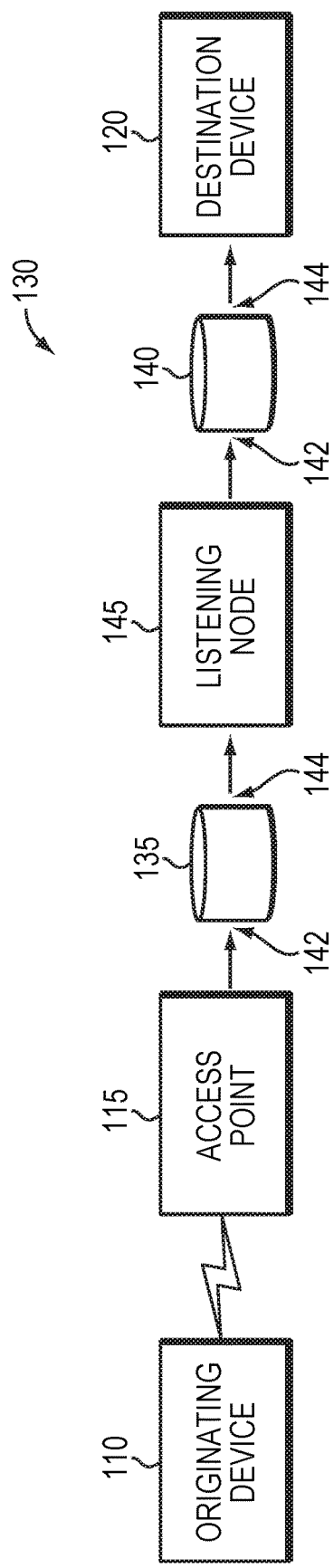
FIG. 1 is a schematic illustration of a network system including a listening node in accordance with embodiments of the present invention.

FIG. 1 illustrates an exemplary telecommunication network topology on which embodiments of the present invention may be deployed. A transmitting device 110 or "originating node" (such as a smart phone or other wireless communication device) may transmit data over the air to an access point (AP) 115. The AP 115 may forward data packets addressed to the final destination 120 over its wired interface. The network 130 over which the packets travel include many routers and/or switches (collectively referred to as "forwarding devices") representatively indicated at 135, 140. These devices have ingress and egress ports 142, 144 and forward packets to "next hop" intermediate destination forwarding devices according to routing tables and algorithms that respond to prevailing traffic conditions, so that even successive packets transmitted to the same destination 120 may follow different paths through the network 130. A listening node 145 captures network traffic to identify the device type of the originating device 110. In some implementations, an Ethernet tap or the like may be used to facilitate the "sniffing" of traffic.

More generally, the computer network 130 can include various interconnected devices to support wired, wireless, or any other type of two-way communications. In some embodiments, the computer network 130 can be any type of network configured to operatively couple one or more devices (e.g., servers devices, user devices, networking devices, etc.), and enable communications between those devices. In some embodiments, the computer network 130 can include one or more networks such as, for example, a cellular network, a satellite network, a LAN, a WAN, a WLAN, or any wide-area network or combination of networks capable of supporting point-to-point data transfer and communication. In some embodiments, the computer network 160 can include the Internet.

In some embodiments, the computer network 130 can be optionally implemented using any known network protocol including various wired and/or wireless protocols such as, for example, Ethernet, universal serial bus (USB), global system for mobile communications (GSM), enhanced data GSM environment (EDGE), general packet radio service (GPRS), long term evolution (LTE), code division multiple access (CDMA), wideband code division multiple Access (WCDMA), time division multiple access (TDMA), bluetooth, Wi-Fi, voice over internet protocol (VoIP), Wi-MAX, etc.

Figure 2:
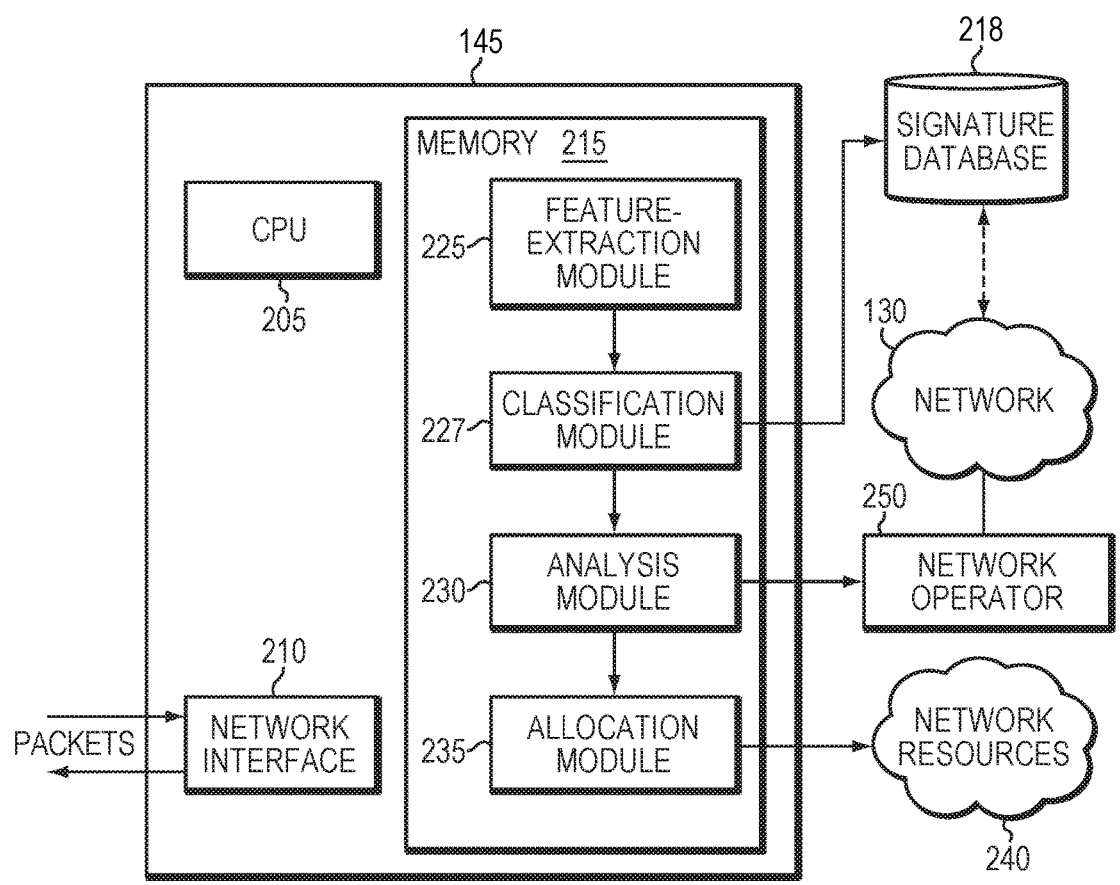
FIG. 2 is a block diagram illustrating a representative listening node in greater detail.

A representative listening node 145 is illustrated in greater detail in FIG. 2. The node includes a CPU 205, a network interface 210 (which may be adapted for wireless and/or wired communication), and a memory 215 including volatile and non-volatile components and configured to store software programs and/or instructions for the various modules described below. In some embodiments, the memory 215 can include, for example, one or more random-access memory (RAM) (e.g., a DRAM, a SRAM, a DDR RAM, etc.), read only memory (ROM), non-volatile memory such as one or more magnetic disk storage devices, optical disk storage devices, flash memory devices, or other non-volatile solid state storage devices. In some embodiments, the memory 215 can include one or more storage devices (e.g., a removable memory) remotely located from other components of the node 145.

In some embodiments, a basic input/output system (BIOS), containing the basic routines that help to transfer information between elements, such as during start-up, is stored in ROM. RAM typically contains data and/or program modules that are immediately accessible to and/or operated on by the CPU 205. The data or program modules may include an operating system, application programs, other program modules, and program data. The operating system may be or include a variety of operating systems such as Microsoft WINDOWS operating system, the UNIX operating system, the LINUX operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

In some embodiments, the memory 215 includes other removable or nonremovable, volatile or nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD-ROM or other optical media. Other removable or nonremovable, volatile or nonvolatile computer storage media that can be used in the exemplary operating environment include, but are not limited to, magnetic tape cassettes, flash memory cards, digital versatile disks, digital video tape, solid state RAM, solid state ROM, and the like. The memory 215 can be connected to a system bus (not shown in FIG. 2) through a removable or non-removable memory interface. A database 218 of packet signatures (e.g., a TAC database) can be stored within the memory 215 and/or on a separate storage device 218, which is typically local to the listening node 145 for speed but which may be updated (not shown in FIG. 1) via the network 130.

The CPU 205 can be any type of processing device or processing unit. The CPU 205 can execute various applications, programs and/or functions included in the software programs and/or modules stored in the memory 215. Such a processor can be, for example, a microprocessor, a digital signal processor (DSP), a field programmable gate array (FPGA), an application-specific integrated circuit (ASIC), and/or the like. The CPU 205 can be configured to control the operations of other components and/or modules of the listening node 145, including the network interface 210 (which can include, for example, a standard wired interface and/or a standard wireless interface—e.g., a Wi-Fi interface.

In the illustrated embodiment, the bask functions including those of the present invention are provided by a series of modules including a feature-extraction module 225, a classification module 227, and an analysis module 230. An allocation module 235 may be included to effect changes to the network 130 or particular resources 240 thereof in response to traffic analysis performed by the analysis module 230. Each module included in the node 145 can be a hardware-based module (e.g., a DSP, a FPGA, an ASIC, etc.), a software-based module (e.g., a module of computer code executed at a processor, a set of processor-readable instructions executed at a processor, etc.), or a combination of hardware and software modules. Instructions or code of each module can be stored in the memory 215 of the listening node 145 and executed at the CPU 205. Moreover, in some embodiments, the allocation module 235 can be a dedicated hardware component that is separate from the other modules included in the memory 215.

The feature-extraction module 225 measures, determines and/or records one or more traffic or packet properties, or signatures, as network traffic is collected. Signature collection generally involves copying packets traversing the network 130 so they reach their next destination unmodified. The types of signatures that can be collected is very large, and includes flow parameters (such as packet inter-arrival time and packet round-trip time (RTT)) as well as packet-level parameters such as such as initial packet size, initial "time to live," window size, maximum segment size, window scaling value, and the status of one or more TCP flags or hits (e.g., "don't fragment," "sackOK," "nop"). These parameters may be measured using, for example, deep packet inspection or other suitable techniques.

Figure 3:
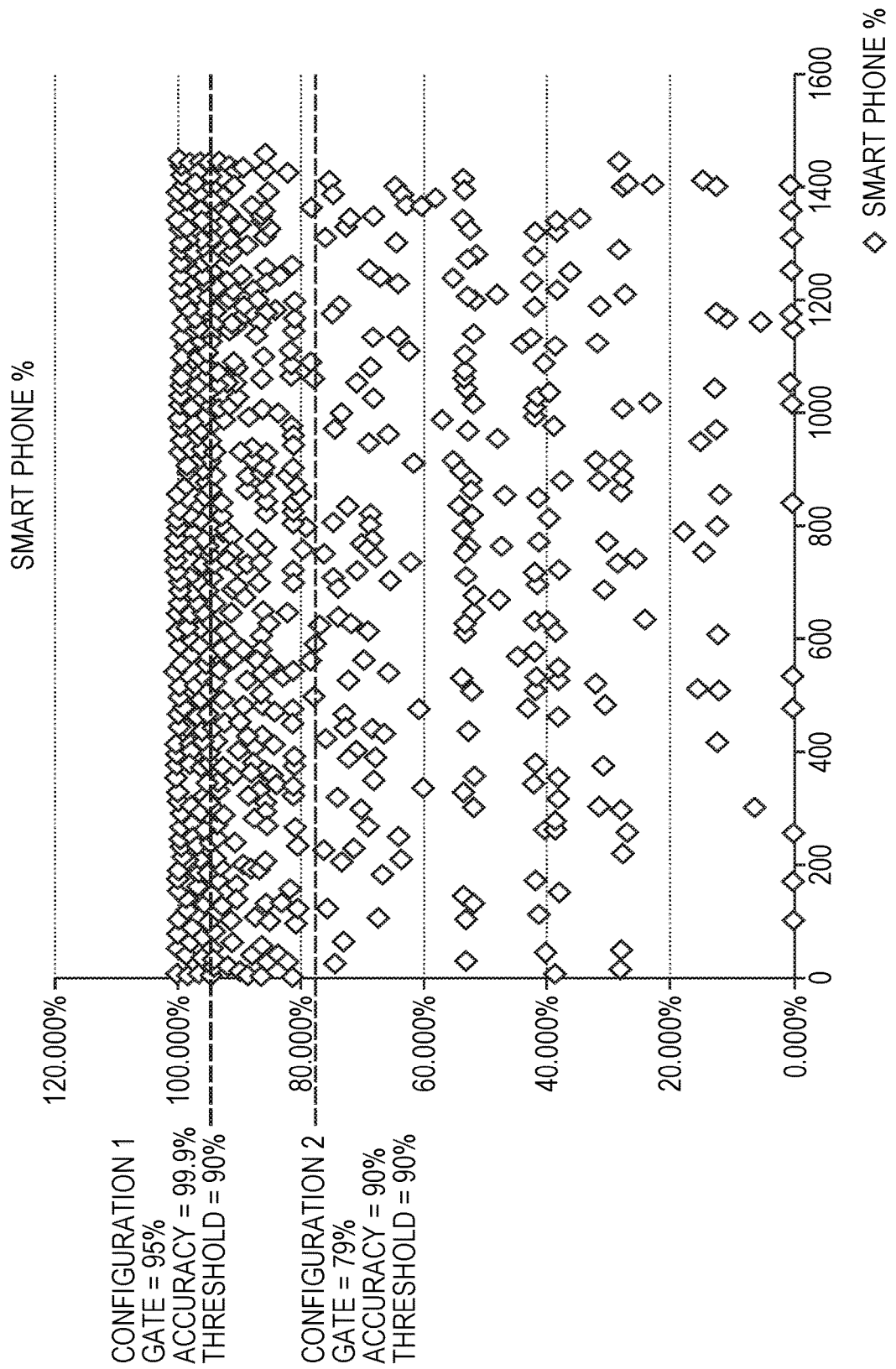
FIG. 3 is a flow chart illustrating a method in accordance with embodiments of the invention.

Operation of an embodiment of the invention may be understood with reference to FIGS. 2 and 3. As illustrated in Table 1 below, which corresponds to a portion of the signature database 218, different categories of device may be associated with different combinations of characteristics, such as TCP or operating-system parameters, that alone or in combination, can serve to identify the device. One or more such parameters, including associated values or value ranges, is herein referred to as a "signature" or a "signature element." For example, a signature may be one or more flow parameters, one or more TCP parameters, or a combination. The classification module 227 receives packets and attempts to identify the originating device, or the category to which the originating device belongs, based on extracted features and the contents of the signature database 218.

Thus, for many purposes, it is not necessary to identify a device at the TAC level; it may suffice, as suggested in Table 1, to know the type of device to a desired level of specificity. In Table 1, the columns following the Signatures column correspond to the categories into which an unknown device is to be placed with a desired degree of confidence. The number of columns depends on the application and the desired accuracy level. For example, if a particular analysis depends only on whether an unknown device is or is not a smart phone, the confidence level can be very high based on a minimum number of features; on the other hand, with enough signatures and data and/or a tolerance for lower accuracy levels, unknown devices can be characterized with commensurately greater specificity (i.e., among more columns). The desired accuracy, of course, depends on how the traffic analysis is to be used. If, for example, the purpose is to diagnose a network traffic bottleneck, the percentage of traffic corresponding to smart phones may dictate changes to routing algorithms in the most-affected routers, or more long-term measures such as equipment upgrades or expansion.

The numeric values (i.e., population fractions) in the second and successive entries in each row of Table 1 add up to 100%. Each numeric entry of a row represents the percentage of devices in the corresponding category that exhibit the signature specified for that row. Even a small percentage of "unknown" devices that cannot be classified may significantly hamper efforts to diagnose network anomalies or determine the proper ameliorative action.

TABLE 1

| Signatures | Smart Devices | Dongle/Routers | Others | Unknown |
|---|---|---|---|---|
| Signature 1 (S1) | 90% | 4% | 1% | 5% |
| Signature 2 (S2) | 68% | 18% | 1% | 3% |
| Signature 3 (S3) | 10% | 80% | 10% | 0% |
| Signature 4 (S4) | 88% | 5% | 2% | 5% |
| ... | | | | |
| ... | | | | |

The accuracy of a classification (i.e., a category assignment) for an unknown device based on a given signature is defined based on how frequently known devices with that signature fall within a category. Often a single signature is insufficient to classify an unknown device with a reasonable level of accuracy. Hence it may be useful, for a given unknown device, to determine the percentage of such devices exhibiting each of a plurality of signatures. Assume, for example, that the unknown devices are identified by TACs; a signature table may be defined in the signature database 218 for n unknown devices as follows:

TABLE 2

| TAC | $S_1$ | $S_2$ | $S_3$ | ... | $S_N$ |
|---|---|---|---|---|---|
| TAC 1 | 30% | 40% | 0% | ... | 5% |
| TAC 2 | 12% | 18% | 1% | ... | 3% |
| TAC 3 | 10% | 60% | 10% | ... | 0% |
| TAC 4 | 15% | 5% | 9% | ... | 5% |
| ... | | | | | |
| TAC N | | | | | |

It is generally not a simple matter to map a device in Table 2 to one of the categories in Table 1 based on the device signature percentages, because it is unlikely that the unknown device will exhibit a particular set of signatures or signature elements exactly matching one of the entries in Table 1. Moreover, if only a small percentage of a particular type of device exhibits even a highly predictive signature, that signature will not be especially predictive for that type of device.

Hence, as a first step, a threshold is defined as the minimum value for one or more of the signatures in Table 2; that is, at least a threshold percentage of the devices of a given unknown type will exhibit the signature. This threshold value may be varied as described below. Databases corresponding to Tables 1 and 2 are maintained in the signature database component 218.

The predictive accuracy of a given set of signatures cannot be determined a priori because the degree to which they are independent is unknown. Accordingly, embodiments of the invention utilize "training" data from known devices to determine, for a given set of signatures, the percentage of devices exhibiting the signature that also fall within one of the classification categories in Table 1. That is, for each of the signatures satisfying the threshold, a certain percentage of devices with that signature will be properly classified. A minimum necessary value for that percentage is herein referred to as the "gate." This value can be varied to act as a filter. The set of signatures both satisfying the minimum threshold requirement and exceeding a given gate value will be associated with an overall predictive accuracy level for each classification category, i.e., the percentage of devices exhibiting the set of signatures that is properly classified within a given category.

As shown in FIG. 3, the gate may be varied to achieve an optimal predictive accuracy level for a given set of signatures. In the figure, the vertical axis represents the gate value and each point along the horizontal axis corresponds to a signature (of which there are over 1400). All signatures have a threshold of at least 90%. For the signature combination called CONFIGURATION 1, each signature also has a gate of at least 95%, resulting in an overall predictive accuracy of 99.9%—i.e., nearly 100% of devices exhibiting the CONFIGURATION 1 signature set fall within the relevant classification category. For the signature combination called CONFIGURATION 2, the gate is set at a lower minimum, and consequently the predictive accuracy of the signature decreases. That is, even though more signatures (the number of dots above the line) are used, overall accuracy is lower because the predictive capacities of the signatures are lower.

The relationship between gate and predictive accuracy can be complex; simply raising the gate does not guarantee a higher predictive accuracy because, while the signatures above the gate have high predictive accuracy individually, there may not be enough of them to ensure overall predictive accuracy. And while lowering the gate ensures that more signatures will be used, the falloff in their individual predictive accuracies may result in no overall predictive benefit, as illustrated in FIG. 3. It is generally found that the gate may be adjusted for a given signature set to produce an optimal "equilibrium" level beyond which additional benefits are minor or non-existent.

Thus, to classify an unknown device (i.e., one that the classification module 227 has been unable to identify based on known signatures), the analysis module 230 identifies signatures for the unknown device that are above the threshold, and then analyzes these signatures to identify a subset thereof that produce a desired classification accuracy. An advantage to this approach is that the classifier values used to generate entries in Table 1 for new devices may be updated as frequently as desired, and on an automated basis. Moreover, once an unknown device is classified with a high degree of accuracy, that identifier (e.g., TAC) can be added to the training set of "known" devices to improve the classification process for subsequent unknown devices.

In various embodiments, the analysis module 230 uses a machine-learning approach to statistical classification. For example, a training set of known devices and signatures may be used to discover potentially predictive relationships between signatures and device identities—i.e., the classification accuracy discussed above. The analysis module 230 may use bootstrap aggregating, or "bagging," not only to train the classification module 227 but also to estimate the gate for a given threshold and a desired degree of accuracy. Bagging trains each classifier (i.e., predictive set of signatures) on a random redistribution of the training set, which is drawn from a database of known signature/device correspondences (e.g., a TAC database). Each individual classifier in an ensemble of classifiers is generated with a different random sampling of the training set.

For example, in one embodiment, the analysis module 230 randomly selects 1% of a list of known TACs from a TAC database. It repeats this process twice to create three such sets to avoid statistical skew. The accuracy of a proposed (e.g., the previously used) gate value is determined by reference to this sample—i.e., the TAC sets are used to determine the accuracy with devices exhibiting a particular signature will be properly classified based on that signature. The gate may then be incremented or decremented (e.g., by a fixed amount that balances computational overhead with the change in accuracy resulting the increment or decrement), and the accuracy recomputed, until equilibrium is reached and further gate increases produce no meaningful classification benefit.

With renewed reference to FIG. 1, the listening node 145 may be a single machine or its functionality may be spread over multiple distributed devices; for example, some or many routers and switches within the network 130 may be equipped to gather signature information from packets passing therethrough and make these available to a network management server, which implements the feature-extraction module 225, the classification module 227, the analysis module 230, and the allocation module 235. In other embodiments, classification and analysis may be performed at the routers and switches, and one or more network management servers receive or access this information in order to computationally make allocation decisions.

The listening node 145 (or network management server(s)) can be operated and managed by a network operator 250; as noted above, the network operator 250 may be human or one or more computers programmed with conventional network-operation software. The analysis module 230 may identify and/or diagnose network anomalies based on the discovered classification identities of previously unknown devices—e.g., traffic from particular types of devices may need to be re-routed to forwarding devices better suited to that type of traffic. In some instances, identification of a device type responsible for a particular flow of problematic traffic may indicate the need for a repair. The allocation module 235 may allocate repair resources (e.g., the network resources 240) thereto. For example, the allocation module 235 can generate, based on the identified network anomaly or anomalies, one or more allocation commands to allocate a part or all of the network resources 240 to fix the identified network anomaly.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

What is claimed is:

1. A system for identifying unknown devices communicating over a computer network, the system comprising:
   a computer network comprising a plurality of intercommunicating forwarding devices for receiving packets from originating devices via one or more ingress ports and forwarding packets via one or more egress ports to destination devices;
   at least one listening node connected to the network and comprising:
      a) a network interface for receiving packet information from one or more of the forwarding devices;
      b) a first database mapping device identifiers to traffic-borne packet characteristics associated therewith;
      c) a second database mapping traffic-borne packet characteristics to a plurality of device classifications, each record of the second database specifying, for at least one traffic-borned packet characteristic, a population fraction of devices within the device classifications that exhibit the at least one traffic-borned packet characteristic;
      d) a feature-extraction module for extracting the traffic-borne packet characteristics from the received packet information;
      e) a classification module for identifying, from the first database, originating devices from the traffic-borne packet characteristics extracted by the feature-extraction module from packet flows associated with the originating devices, and further identifying unknown originating devices for which no identification can be made from entries in the first database; and
      f) an analysis module for classifying the unknown devices identified by the classification module to a user-supplied degree of accuracy within at least one selected device classification, the analysis module being configured to:
         i. identify, for the unknown devices, a plurality of traffic-borne packet characteristics each having an associated population fraction in the second database above a predictiveness threshold for the selected device classification;
         ii. identify a subset of the identified traffic-borne packet characteristics that produces a selected classification accuracy level; and
         iii. determine, based on the identified subset of traffic-borne packet characteristics, whether the unknown device is within at least one said selected device classification at the selected classification accuracy level, and, if so, classifying the device.

2. The system of claim 1, wherein the analysis module is configured to identify the subset of the identified traffic-borne packet characteristics by determining, based on training data from known devices, predictive accuracies for the identified traffic-borne packet characteristics corresponding to a population fraction of known devices that exhibit the characteristic.

3. The system of claim 2, wherein the training data are obtained from at least one TAC database.

4. The system of claim 1, wherein each of the traffic-borne packet characteristics is one or more signature elements.

5. The system of claim 4, wherein the signature elements are packet parameters, flow parameters, and/or operating-system parameters.

6. The system of claim 1, wherein the analysis module is further configured to adjust the predictiveness threshold to a value above which analysis based solely on traffic-borne packet characteristics exceeding the threshold classification accuracy level do not substantially increase the classification accuracy level.

7. The system of claim 1, further comprising an allocation module for allocating network resources based on the device classification.

8. The system of claim 1, further comprising an allocation module for allocating repair resources based on the device classification.

9. A method of identifying unknown devices communicating over a computer network comprising a plurality of intercommunicating forwarding devices for receiving packets from originating devices via one or more ingress ports and forwarding packets via one or more egress ports to destination devices, the method comprising the steps of:
   providing a first database mapping device identifiers to traffic-borne packet characteristics associated therewith;
   providing a second database mapping traffic-borne packet characteristics to a plurality of device classifications, each record of the second database specifying, for at least one traffic-borned packet characteristic, a population fraction of devices within the device classifications that exhibit the at least one traffic-borned packet characteristic;
   receiving packets over the network and extracting traffic-borne packet characteristics therefrom;
   identifying, using the first database, originating devices from the extracted traffic-borne packet characteristics thereof;
   identifying unknown originating devices for which no identification can be made from entries in the first database; and
   classifying the unknown devices to a user-supplied degree of accuracy within at least one selected device classification by:

a) identifying, for the unknown devices, a plurality of traffic-borne packet characteristics each having an associated population fraction in the second database above a predictiveness threshold for the selected device classification;
b) identifying a subset of the identified traffic-borne packet characteristics that produces a selected classification accuracy level; and
c) based on the identified subset of traffic-borne packet characteristics, determining whether the unknown device is within at least one said selected device classification at the selected classification accuracy level, and, if so, classifying the device.

10. The method of claim 9, wherein the subset of the identified traffic-borne packet characteristics are identified by determining, based on training data from known devices, predictive accuracies for the identified traffic-borne packet characteristics corresponding to a population fraction of known devices that exhibit the characteristic.

11. The method of claim 10, further comprising the step of obtaining the training data from at least one TAC database.

12. The method of claim 9, wherein each of the traffic-borne packet characteristics is one or more signature elements.

13. The method of claim 12, wherein the signature elements are packet parameters, flow parameters, and/or operating-system parameters.

14. The method of claim 9, further comprising the step of adjusting the predictiveness threshold to a value above which analysis based solely on traffic-borne packet characteristics exceeding the threshold classification accuracy level do not substantially increase the classification accuracy level.

15. The method of claim 9, further comprising the step of allocating network resources based on the device classification.

16. The method of claim 9, further comprising the step of allocating repair resources based on the device classification.

* * * * *